Patented Sept. 18, 1951

2,568,188

UNITED STATES PATENT OFFICE 2,568,188

LIQUID COATING COMPOSITION

John R. Fisher, Jr., Dayton, Ohio, assignor to Industrial Metal Protectives, Inc., Dayton, Ohio, a corporation of Delaware No Drawing. Application November 9, 1949, Serial No. 126,451

9 Claims. (Cl. 260—19)

This invention relates to corrosion-resisting coatings. More particularly, it relates to an improved protective coating composition and the process for manufacturing same.

Protective coatings for surfaces to be effective must be continuous. The dried coating must be insoluble in liquid mediums which they contact and be impervious to corrosive elements. In addition, the coatings must have high tenacity for the base to withstand abrasion and shock incident to the normal use.

New types of coating material have come into use such as those disclosed in the application of Alexander McDonald, filed November 14, 1946, Serial No. 709,770, entitled "Improvement in or Relating to Coating Compositions," now Patent No. 2,509,875, and in the application of John R. Fisher, Jr., filed December 6, 1947, Serial No. 790,233, entitled "Coating Composition and Method of Making."

The coating compositions consist basically of powdered metals suspended in aqueous solutions of sodium silicate or in resin solutions. These powdered metal base coatings have been subject to the disadvantages that the mixes could not be prepared a reasonable time in advance of use.

In the coatings such as were disclosed by Fisher the oils necessary for tenacious, shock-proof character, became oxidized, losing their effectiveness. Further, the presence of finely divided metals apparently accelerated the oxidation reaction.

It is an object of the present invention to overcome the limitations and disadvantages of the above described methods.

It is an object of this invention to provide a coating which can be prepared in advance of use.

It is another object of the present invention to provide a coating that is durable.

It is still a further object of this invention to prepare coatings which rapidly dry to tough, adhering films.

It is a further object of this invention to prepare coatings which air dry to as durable coatings as had heretofore been produced by baking methods.

It is another object of this invention to prepare coatings which remain fluid and spreadable for extended periods of time, thus making for smooth continuous films.

It is another object of this invention to produce anti-corrosion coating using finely divided metal powders which if used as a base coat, permits superimposing of additional coatings without additional treatment.

It is still a further object of this invention to provide a simple method of preparing coating compositions containing finely divided metals which do not rapidly oxidize and gel.

These and other objects and advantages will become apparent upon reference to the following description:

The improved coating composition is prepared by mixing at room temperature a solution of a low acid resin, a vegetable drying oil, a solvent, metallic drier, an aromatic distillation residue, and finely divided metallic powder.

This composition or suspension can be applied by spraying, by brushing, or by dipping. The coating applied may be hardened by either air drying or force drying methods. If the composition is utilized as an undercoat, it may be overlaid with enamels, wrinkle finishes or any of the industrial finishes. As an undercoat, the composition needs only a short period for surface drying, following which an overcoat can be directly applied, and both coatings simultaneously baked to dryness.

Heretofore anti-corrosion coatings or primers have customarily been dried and in addition many of such coatings must have additional treatments to render them satisfactory for the application of finished coats to avoid ultimate destruction of the finished coats by the primer coat or the formation of bubbles, lumps, etc. under the finished coat.

The coating of the present invention, when used as a primer coat, has developed the unexpected property of permitting the finish coat being applied after a few minutes of air drying of the primer, without any further treatment of the primer.

It is also possible to bake both the primer coat and the finished coat simultaneously, thereby eliminating one baking and a large amount of expensive handling of mass production items on conveyor lines.

After four hours of air drying, the coating of this invention is hard enough to allow packing and shipping of the articles. In twelve hours the coating has acquired its final hardness which is essentially higher than coatings produced heretofore. If the production is to be accelerated, it is advisable to use forced drying. The final coating obtained thereby, however, is not at all superior to those finished by air drying.

Baking or forced drying may be carried out at temperatures in the range of approximately 200° F. to 400° F., the preferred temperature being at about 225° F. In the latter case a drying time of about 30 minutes to one hour suffices. If drying is carried out with infra-red light, heating for only 15 minutes may be found necessary.

The low-acid resins operative for the process and products of this invention are those having an acid number of, or below 6, and preferably below 5. For instance, melamine formaldehyde resins, phenol formaldehyde resins, alkyd resins, particularly of the phthalic acid-glycerol type, glyptal resins, ester gums, and dammar gums are among those which have been found satisfactory. These resins are preferably used in the form of a 40 to 60 per cent solution.

Vegetable drying oils, such as oiticica oil, tung oil, dehydrated castor oil, linseed oil, raw or blown, perilla oil are all operative in the compositions of this invention.

Xylol, toluol, naphtha, mineral spirits, and petroleum solvents are the solvents preferred for the compositions of this invention.

As the drier, a mixture of cobalt and lead naphthanates and/or a mixture of cobalt and lead linoleates, in the form of a 4 per cent solution, have been found satisfactory. A portion of these driers may also be replaced by the corresponding manganese salts.

A number of aromatic distillation residues have proven satisfactory as inhibitors of the oxidation of the composition. Creosote oil in particular is preferred. Such equivalent material as naphthols, di-pentene, and the like, may be used for this purpose. The quantity of the inhibitor will vary in accordance with the time delay desired between mixing and use.

In general, quantities ranging from approximately .005 per cent to approximately 0.25 per cent may be used. A quantity corresponding to 0.1 percent by weight of the composition has been found to increase storage life by 6 to 12 months.

The finely divided powder used in this coating composition may be comminuted metals, such as zinc, lead, aluminum, magnesium, cadmium, or alloys thereof. For the intended use powders such as zinc have a fineness such that 90 per cent averages less than 6 microns in size. In other words, material is of such fineness that 90 per cent will pass through a U. S. standard 400 mesh sieve. Preferably, the powder should average 3 microns or smaller. Finely comminuted powders of this type will constitute approximately 100 to 350 per cent by weight of the solution into which the powders are mixed.

The following proportions of the ingredients have been found to give satisfactory results:

60 to 70 fl. ozs. low-acid resin solution containing 40 to 60 per cent resin
0 to 10 fl. ozs. drying oil
16 to 24 fl. ozs. solvent
½ fl. oz. cobalt drier
½ fl. oz. lead drier
16 to 20 lbs. zinc dust
.05 to .2 fl. ozs. creosote oil In the following a few examples are given for formulae suitable for the coating of my invention:

*Example I*

85 lbs. phthalic acid-glycerol resin solution containing 40 to 60 per cent resin
10¼ lbs. raw linseed oil
32 lbs. mineral spirits
1 lb. lead linoleate
½ lb. cobalt linoleate
2 ozs. creosote oil
250 lbs. zinc dust (90% of which is less than 6 microns in size and preferably averaging 3 microns in size)

This composition is prepared by mixing the liquid ingredients together at room temperature. To this mixture, the zinc dust is added slowly with constant agitation until a smooth suspension is obtained.

There will be a slight foaming during the initial mixing due to the reaction of the zinc and acids present in the resins and the oils. This action ceases in a few minutes and is in no way detrimental to the final composition.

Additional examples are as follows:

*Example II*

64 fl. ozs. phenol formaldehyde resin solution containing 40 to 60 per cent resin
8 fl. ozs. oiticica oil
16 fl. ozs. VM&P naphtha
½ fl. oz. cobalt linoleate
½ fl. oz. lead naphthenate
⅓ fl. oz. creosote oil
20 lbs. zinc dust (90% of which is less than 6 microns in size and preferably averaging 3 microns in size)

*Example III*

64 fl. ozs. phenol formaldehyde resin solution containing 40 to 60 per cent resins
6 fl. ozs. perilla oil
18 fl. ozs. Stoddard solvent (Gulf Oil Co.)
½ fl. oz. cobalt naphthenate
½ fl. oz. lead linoleate
½ fl. oz. creosote oil
19½ lbs. zinc dust (90% of which is less than 6 microns in size and preferably averaging 3 microns in size)

*Example IV*

66 fl. ozs. alkyd resin
2 fl. ozs. dehydrated castor oil
20 fl. ozs. petroleum solvent (flash point 104° F. or higher)
½ fl. oz. cobalt naphthanate
½ fl. oz. lead linoleate
2 fl. ozs. creosote oil
18½ lbs. aluminum dust (90% of which is less than 6 microns in size and preferably averaging 3 microns in size)

*Example V*

67 fl. ozs. Glyptal resin solution containing 40 to 60 per cent resin
1 fl. oz. linseed oil (blown)
10 fl. ozs. toluol
10 fl. ozs. mineral spirits
½ fl. oz. cobalt naphthanate
½ fl. oz. lead naphthanate
½ fl. oz. creosote oil
20 lbs. zinc dust (90% of which is less than 6 microns in size and preferably averaging 3 microns in size)

All of the above mixtures were applied on articles to be coated and then allowed to air-dry or to air dry for about 10 minutes and then baked as described. The coatings obtained therefrom were extremely durable. The coatings on the articles were not affected by rain, salt water, or the like, which proves the excellent protective quality of the coating and the continuity of the film.

The coating composition of Example I was applied to a surface when freshly prepared. A portion of the composition was set aside in a closed container for three months. A companion coating was placed beside the coating made when the composition was freshly prepared. The characteristics of the two coatings were so nearly alike as to raise the question that any differences found were in all probability within the range of experimental error of the testing equipment.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims. For example, oxidizable polymer resins may be substituted in whole or in part for the vegetable drying oil. Such compositions are equally well stabilized by the aromatic distillation residues.

I claim:

1. A liquid coating composition comprising a dispersion of 16 to 20 lbs. zinc dust, the particle size of which is not larger than 6 microns and having an average particle size of 3 microns at least 90% of which is capable of passing through a U. S. standard 400 mesh screen dispersed in 60 to 70 fl. ozs. solution containing 40 to 60 per cent low acid resin, having an acid number not exceeding 6 in said solution, said solution further containing up to 10 fl. ozs. drying oil, 16 to 24 fl. ozs. solvent and about 1 fl. oz. drier.

2. A liquid coating composition comprising a dispersion of 16 to 20 lbs. zinc dust, the particle size of which is not larger than 6 microns and having an average particle size of 3 microns at least 90% of which is capable of passing through a U. S. standard 400 mesh screen dispersed in 60 to 70 fl. oz. solution containing 40 to 60 per cent low acid resin, having an acid number not exceeding 6 in said solution, said solution further containing up to 10 fl. ozs. drying oil, 16 to 24 fl. ozs. solvent, about ½ fl. oz. cobalt drier and ½ fl. oz. lead drier.

3. A liquid coating composition comprising a dispersion of 16 to 20 lbs. zinc dust, the particle size of which is not larger than 6 microns and having an average particle size of 3 microns at least 90% of which is capable of passing through a U. S. standard 400 mesh screen dispersed in 60 to 70 fl. ozs. solution containing 40 to 60 per cent low acid resin, having an acid number not exceeding 6 in said solution, said solution further containing up to 10 fl. ozs. drying oil, 16 to 24 fl. ozs. solvent and about 1 fl. oz. drier and .05 to .2 fl. oz. cresote oil.

4. A liquid coating composition comprising a dispersion of 250 lbs. zinc dust, the particle size of which is not larger than 6 microns and having an average particle size of 3 microns at least 90% of which is capable of passing through a U. S. standard 400 mesh screen dispersed in 85 lbs. phthalic acid-glycerol resin solution containing 40 to 60% resin, said solution further containing about 10¼ lbs. raw linseed oil, about 32 lbs. mineral spirits, about 1 lb. lead linoleate, about ½ lb. cobalt linoleate and about 2 ozs. creosote oil.

5. A liquid coating composition comprising a dispersion of 20 lbs. zinc dust, the particle size of which is not larger than 6 microns and having an average particle size of 3 microns at least 90% of which is capable of passing through a U. S. standard 400 mesh screen dispersed in about 64 fl. ozs. phenol formaldehyde resin solution containing 40 to 60% resin, about 8 fl. ozs. oiticica oil, about 16 fl. ozs. VM&P naphtha, about ½ fl. oz. cobalt linoleate, about ½ fl. oz. lead naphthenate, and about ⅓ fl. oz. creosote oil.

6. A liquid coating composition comprising a dispersion of 19½ lbs. zinc dust, the particle size of which is not larger than 6 microns and having an average particle size of 3 microns at least 90% of which is capable of passing through a U. S. standard 400 mesh screen dispersed in about 64 fl. ozs. phenol formaldehyde resin solution containing 40 to 60% resin, about 6 fl. ozs. perilla oil, about 18 fl. ozs. Stoddard solvent, about ½ fl. oz. cobalt naphthenate, about ½ fl. oz. lead linoleate and about ½ fl. oz. creosote oil.

7. A liquid coating composition comprising a dispersion of 20 lbs. zinc dust, the particle size of which is not larger than 6 microns and having an average particle size of 3 microns at least 90% of which is capable of passing through a U. S. standard 400 mesh screen dispersed in about 67 fl. ozs. alkyd resin solution containing 40 to 60% resin, about 1 fl. oz. blown linseed oil, about 10 fl. ozs. toluol, about 10 fl. ozs. mineral spirits, about ½ fl. oz. cobalt naphthanate, about ½ fl. oz. lead naphthanate, and about ½ fl. oz. creosote oil.

8. A liquid coating composition comprising a dispersion of 20 lbs. of zinc dust, the particle size of which is not larger than 3 microns, at least 90% of which is capable of passing through a U. S. standard 400 mesh screen dispersed in about 60 to 70 fl. ozs. solution containing 40 to 60% phenol formaldehyde resin, having an acid number not exceeding 6 in said solution, said solution further containing up to 10 fl. ozs. linseed oil, 16 to 24 fl. ozs. solvent and about 1 fl. oz. drier.

9. A liquid coating composition comprising a dispersion of 20 lbs. of zinc dust, the particle size of which is not larger than 3 microns, at least 90% of which is capable of passing through a U. S. standard 400 mesh screen dispersed in about 60 to 70 fl. ozs. solution containing 40 to 60% alkyd resin, having an acid number not exceeding 6 in said solution, said solution further containing up to 10 fl. ozs. drying oil, 16 to 24 fl. ozs. solvent and about 1 fl. oz. drier.

JOHN R. FISHER, JR.

REFERENCES CITED

The following references are of record in the file of this patent:

UNITED STATES PATENTS

| Number | Name | Date |
| --- | --- | --- |
| 1,942,757 | Iliff et al. | Jan. 9, 1934 |
| 2,346,624 | Straus | Apr. 11, 1944 |
| 2,436,420 | Clayton | Feb. 24, 1948 |
| 2,468,920 | Brown et al. | May 3, 1949 |
| 2,493,020 | Osdal et al. | Jan. 3, 1950 |
| 2,509,875 | McDonald | May 30, 1950 |

FOREIGN PATENTS

| Number | Country | Date |
| --- | --- | --- |
| 115,134 | Australia | May 12, 1942 |